United States Patent [19]
Pham et al.

[11] Patent Number: 5,767,643
[45] Date of Patent: Jun. 16, 1998

[54] COMMUTATION DELAY GENERATOR FOR A MULTIPHASE BRUSHLESS DC MOTOR

[75] Inventors: Giao M. Pham, Milpitas; Barry J. Concklin; James H. Nguyen, both of San Jose, all of Calif.

[73] Assignee: Siliconix Incorporated, Santa Clara, Calif.

[21] Appl. No.: 595,812

[22] Filed: Feb. 2, 1996

[51] Int. Cl.⁶ .................................................... H02P 6/14
[52] U.S. Cl. .................... 318/439; 318/254; 388/809
[58] Field of Search ................................. 318/254, 138, 318/439; 388/800, 809, 811, 812

[56] References Cited

U.S. PATENT DOCUMENTS

| | | | |
|---|---|---|---|
| 4,162,435 | 7/1979 | Wright | 318/138 |
| 4,250,435 | 2/1981 | Alley et al. | 318/138 |
| 4,275,343 | 6/1981 | Fulton et al. | 318/721 |
| 4,394,610 | 7/1983 | Dolland | 318/803 |
| 4,401,934 | 8/1983 | Dolland et al. | 318/798 |
| 4,455,513 | 6/1984 | Fulton et al. | 318/138 |
| 4,513,230 | 4/1985 | Erdman | 318/254 |
| 4,540,906 | 9/1985 | Blom | 310/67 |
| 4,575,652 | 3/1986 | Gogue | 310/49 |
| 4,642,537 | 2/1987 | Young | 318/254 |
| 4,656,400 | 4/1987 | Pailthorp et al. | 318/135 |
| 4,659,969 | 4/1987 | Stupak, Jr. | 318/128 |
| 4,665,348 | 5/1987 | Stupak, Jr. | 318/135 |
| 4,673,849 | 6/1987 | Sears et al. | 318/272 |
| 4,743,815 | 5/1988 | Gee et al. | 318/254 |
| 4,751,459 | 6/1988 | Stupak, Jr. | 324/164 |
| 4,757,241 | 7/1988 | Young | 318/254 |
| 4,774,428 | 9/1988 | Konecny | 310/198 |
| 4,928,043 | 5/1990 | Plunkett | 318/254 |
| 4,988,939 | 1/1991 | Reichard et al. | 318/800 |
| 5,015,939 | 5/1991 | Konecny | 318/701 |
| 5,034,668 | 7/1991 | Bausch | 319/254 |
| 5,258,695 | 11/1993 | Utenick et al. | 318/138 |
| 5,272,803 | 12/1993 | Harrison et al. | 29/596 |
| 5,319,289 | 6/1994 | Austin et al. | 318/254 |
| 5,350,988 | 9/1994 | Le | 318/254 |
| 5,466,997 | 11/1995 | Utenick et al. | 318/254 |

FOREIGN PATENT DOCUMENTS

| | | |
|---|---|---|
| 42 31 226 A | 3/1994 | Germany . |
| 6 253584 | 9/1994 | Japan . |
| 88 01763 | 3/1988 | WIPO . |

OTHER PUBLICATIONS

"Brushless DC Motor Drive Circuit", *Philips Development Data*, Jan. 1989.

*Primary Examiner*—John W. Cabeca
*Attorney, Agent, or Firm*—Skjerven, Morrill, MacPherson, Franklin & Friel; David E. Steuber

[57] ABSTRACT

A commutation control circuit provides a substantially periodic series of commutation signals to a conventional motor sequencer. The control circuit includes a frequency-to-current converter that receives the series of commutation signals and outputs a current that has a magnitude proportional to the average period of the series of commutation signals. The proportional current is then used to charge and/or discharge a known capacitance after a back-EMF sensor determines the appropriate starting time of a delay period. The capacitance and the proportional current are selected such that the proportional current charges the capacitance to a selected voltage level to trigger a commutation signal after the appropriate delay period.

17 Claims, 10 Drawing Sheets

(Prior Art)

FIG. 4B

(Prior Art)

COMMUTATION DELAY GENERATOR FOR A MULTIPHASE BRUSHLESS DC MOTOR

CROSS-REFERENCE TO RELATED APPLICATIONS

The present application is related to application Ser. No. 08/594,676, filed herewith, entitled "Frequency-To-Current Converter," by Giao M. Pham, which is incorporated herein by this reference.

BACKGROUND

1. Field of the Invention

This invention relates generally to commutation circuits for electric motors.

2. Description of Related Technology

Hard disk drive systems ("hard drives") are a predominant mechanism for providing large volumes of low-cost, computer-accessible memory. A typical hard drive includes a spin motor for rotating one or more magnetic storage disks during data read and write operations. An electronic control and driving circuit is coupled between the spin motor and a host microprocessor interface to provide drive signals to power the motor windings.

Figure 1:
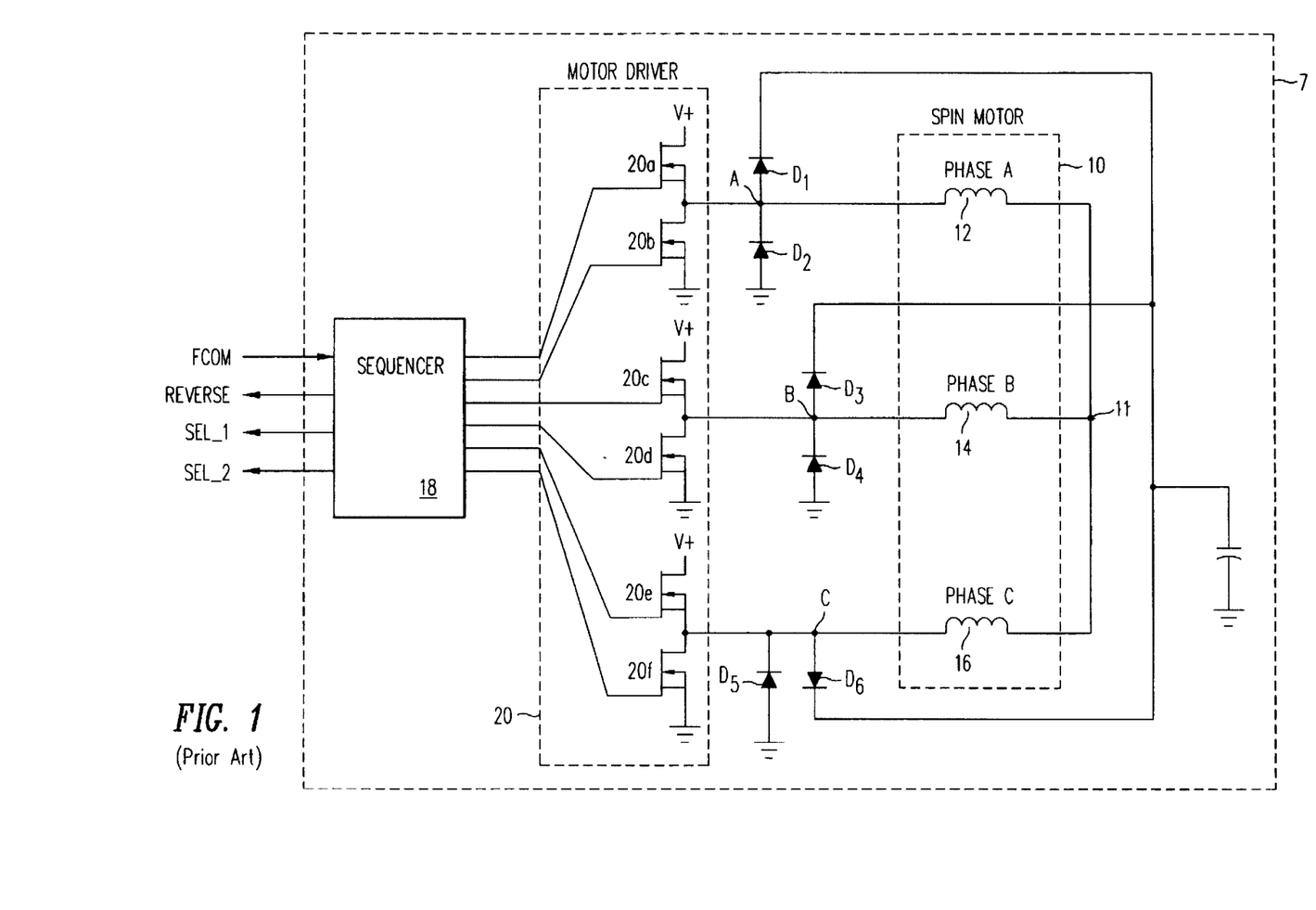
FIG. 1 is a schematic diagram of conventional motor and select circuitry 7.

FIG. 1 is a schematic diagram of conventional motor and drive circuitry 7, which includes a portion of a three-phase brushless spin motor 10 connected to a conventional commutation sequencer 18 via a motor driver 20. For the example illustrated herein, spin motor 10 is assumed to include three sets of phase windings, each of which is selectively driven at a predetermined phase. In FIG. 1, the three sets of windings are represented by phase windings 12, 14, and 16, which are arranged around a rotor shaft (not shown) and have a common connection at a center tap 11. As known to those skilled in the art, sequencer 18 and a motor driver 20 collectively operate to selectively drive pairs of phase windings 12, 14, and 16 to induce rotation of the rotor shaft of motor 10. Diodes $D_1$–$D_6$ protect motor and drive circuitry 7 from extreme voltages on nodes A, B, and C that would otherwise result due to the inductances of windings 12, 14, and 16.

Figure 2A:
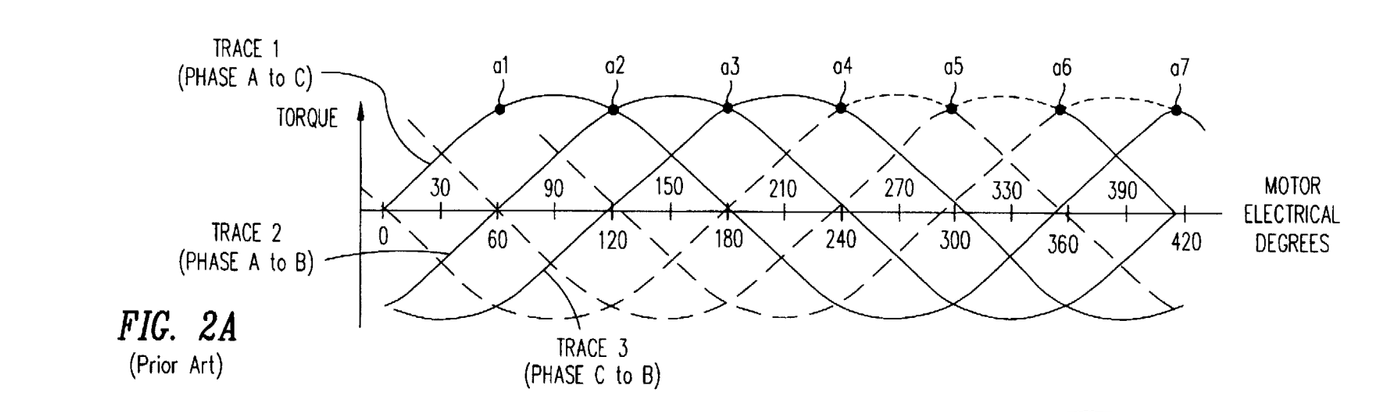
FIG. 2A is a set of traces illustrating motor torque with respect to motor electrical degrees.

Referring next to FIG. 2A in conjunction with FIG. 1, traces 1, 2, and 3 illustrate the motor torque generated when a constant current flows through selected pairs of phase windings 12, 14, and 16. Trace 1 shows the motor torque curve with respect to electrical degrees when transistors 20a and 20f are turned on (20b through 20e turned off), resulting in current flow through phase-A winding 12 and phase-C winding 16. Similarly, trace 2 shows the motor torque curve on the common horizontal axis when transistors 20a and 20d are turned on, resulting in current flow through phase-A winding 12 and phase-B winding 14. Finally, trace 3 shows the motor torque curve when transistors 20d and 20e are turned on, resulting in current flow through phase-C winding 16 and phase-B winding 14. The maximum torque points occur 60 electrical degrees apart. For an eight-pole motor, 60 electrical degrees correspond equivalently to 15° of mechanical rotation of the rotor shaft.

To spin a rotor shaft of a motor continuously in one direction, the motor torque should be either continuously positive or continuously negative. A continuously positive motor torque, for example, can be provided by designing and controlling sequencer 18 and motor driver 20 to transfer current to selected pairs of windings in a predetermined and precisely timed sequence so that the overall torque curve of the motor is defined along the maximum segments connecting points a1 through a7 of FIG. 2A. The act of transferring current from one pair of windings to the next is conventionally called "commutation."

The overall torque curve defined by the curves connecting points a1 through a7 results in maximum torque with the least ripple, and thus is considered the result of optimal commutation timing. The predetermined sequence required for turning on the transistors 20a through 20f, as controlled by sequencer 18, is as follows:

Sequence 1: Transistors 20a and 20f are on so that current flows from node A through windings 12 and 16 to node C, generating torque segment a1 to a2;

Sequence 2: Transistors 20a and 20d are on so that current flows from node A through windings 12 and 14 to node B, generating torque segment a2 to a3;

Sequence 3: Transistors 20d and 20e are on so that current flows from node C through windings 16 and 14 to terminal B, generating torque segment a3 to a4;

Sequence 4: Transistors 20b and 20e are on so that current flows from node C through windings 16 and 12 to node A, generating torque segment a4 to a5;

Sequence 5: Transistors 20b and 20c are on so that current flows from node B through windings 14 and 12 to node A, generating torque segment a5 to a6; and Sequence 6: Transistors 20c and 20f are on so that current flows from node B through windings 14 and 16 to node C, generating torque segment a6 to a7.

Figure 2B:
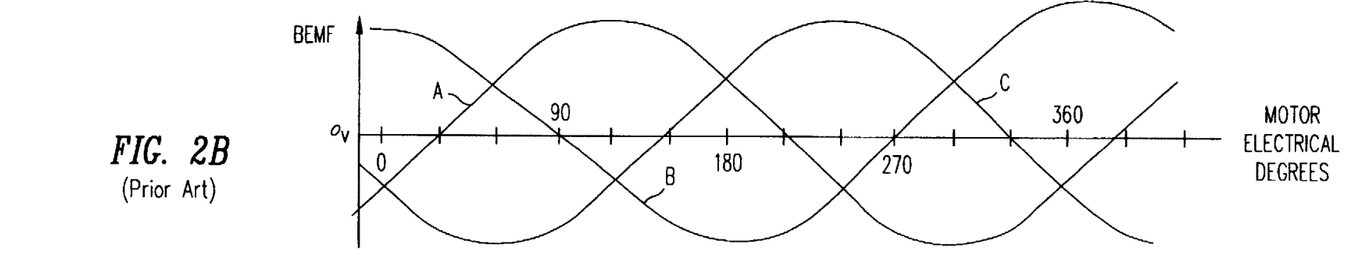
FIG. 2B is a set of traces illustrating the BEMF signals generated in each phase winding of a spin motor with respect to motor electrical degrees.
Figure 2C:
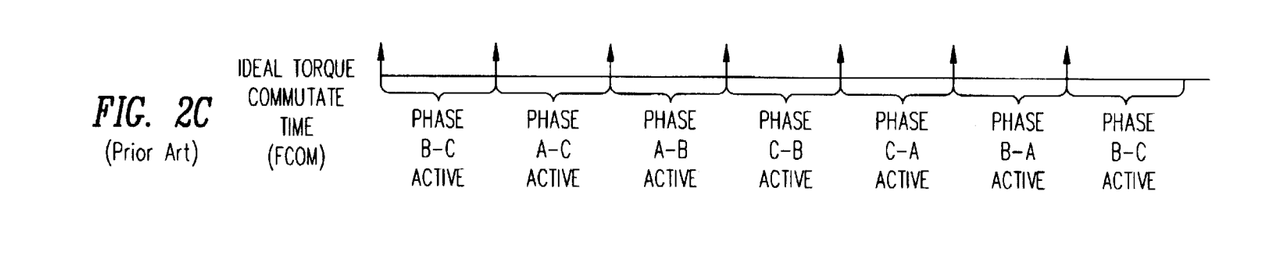
FIGS. 2C and 3A are timing diagrams illustrating the ideal commutation times and active phase windings with respect to motor electrical degrees.
Figure 3A:
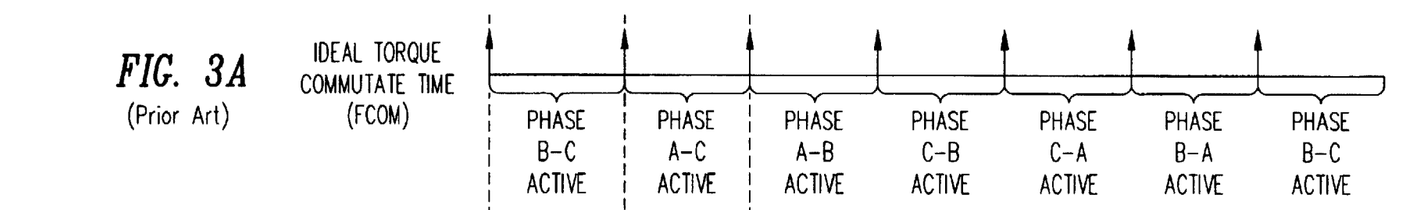

In early hard drives, commutation timing of brushless motors was controlled using Hall Effect sensors that were placed within the motor. As hard drives became smaller, the Hall sensors were removed to save space. To facilitate this removal, a method of determining optimal commutation timing was developed that did not require Hall sensors. This method involves the phenomenon of back electromotive force (BEMF), whereby a changing voltage is induced in the windings as a result of the windings moving through magnetic flux within the motor. The BEMF signals generated for a three-phase motor when measured with respect to center tap 11 are shown as signals A, B, and C in FIG. 2B. Comparing FIGS. 2A and 2B, it is evident that the BEMF signals cross the zero-voltage axis when the motor torques are at their maximum values. To provide the least amount of torque ripple, the motor is commutated at 30 electrical degrees before and after the maximum torque points. These ideal motor commutation times are shown both in FIG. 2C and in FIG. 3A as the signal "FCOM," which conventionally stands for "frequency of commutation." In the vernacular of motor engineers, the individual pulses of the FCOM signal may be referred to as "FCOM pulses."

Figure 3B:
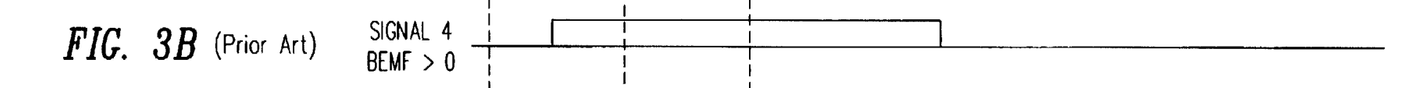
FIGS. 3B through 3D are a set of traces illustrating output signals from BEMF signal comparators.
Figure 3C:
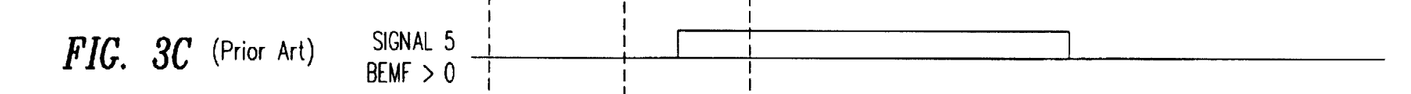
Figure 3D:
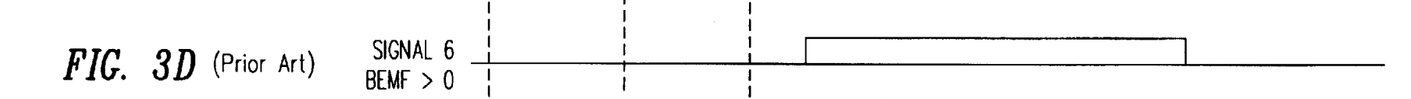

Analog comparators are connected across each phase winding 12, 14, and 16 of the motor to determine when each of the BEMF signals is greater than zero. The output signals generated by these comparators are shown in FIGS. 3B through 3D. The comparator signals of FIGS. 3B through 3D are logically decoded, using conventional means, to generate the tachometer signal shown in FIG. 3E. It is noted that the optimal motor commutation times are shown to occur at the midpoint of each high and low state of the tachometer signal as represented at points X and Y, respectively, of FIG. 3E.

Figure 3E:
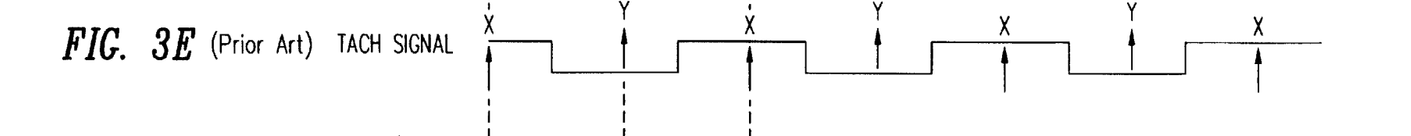
FIG. 3E is a trace of a tachometer signal.
Figure 3F:
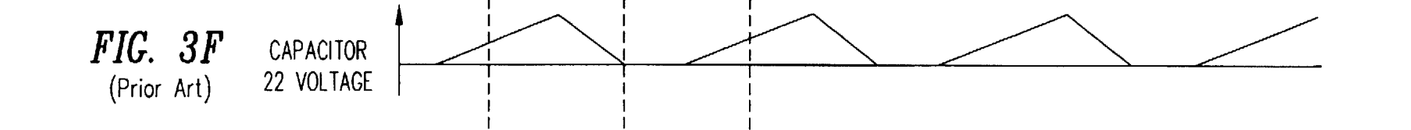
FIGS. 3F and 3G are traces illustrating the voltage levels across a set of capacitors.
Figure 3G:
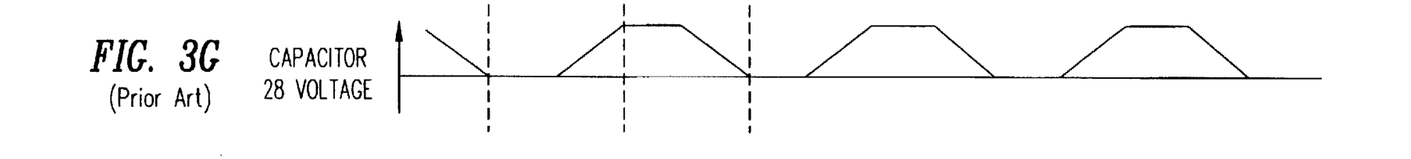
Figure 4A:
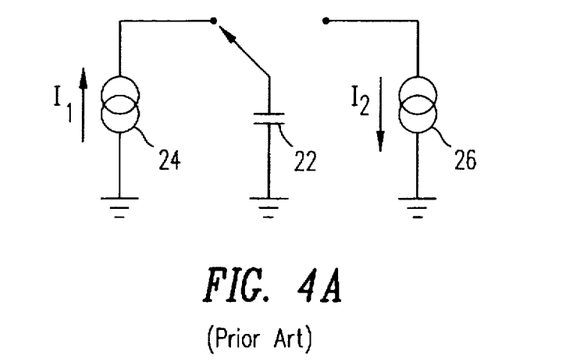
FIGS. 4A and 4B are schematic diagrams of conventional circuits for determining optimal commutation times.
Figure 4B:
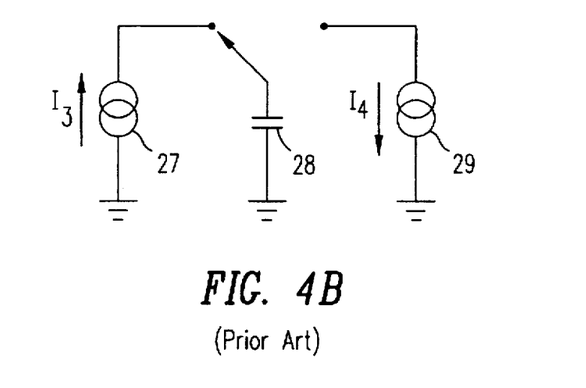

The midpoints X and Y of each high and low state of the tachometer signal are determined in accordance with the circuits of FIGS. 4A and 4B. The voltage waveforms generated across capacitors 22 and 28 of the circuits are shown in FIGS. 3F and 3G, respectively. To generate the waveform of FIG. 3F, capacitor 22 is charged with a conventional constant-current source 24 during the high period of the tachometer signal and is then discharged at twice the rate with a second conventional constant-current sink 26 after the tachometer signal changes states. When the spin motor is running at nominal speed. the capacitor 22 reaches its lowest level at point Y. which is the desired time to commutate the motor. Capacitor 22 is combined with conventional sensing and triggering circuitry (not shown) connected to the sequencer 18 to thereby commutate the motor driver 20 to the next phase.

Capacitor 28 of FIG. 4B is provided to determine the commutation points labeled X. This is accomplished by charging capacitor 28 with a constant-current source 27 during the time at which capacitor 22 is being discharged, and then holding the voltage charged until the tachometer signal changes to a high state. At this time. capacitor 28 is discharged with a constant-current sink 29 that provides a current equal in magnitude but opposite in polarity as compared to the output current of constant-current source 27. When the capacitor 28 reaches its minimum voltage level. conventional sensing and triggering circuitry (not shown) senses the minimum voltage condition and issues an FCOM pulse to sequencer 18. thereby causing sequencer 18 to select the next phase state (i.e., the next pair of windings).

The above-described BEMF technique for determining commutation timing works well in that when the spin motor is first starting up the commutation points are not fixed in time. If the values of capacitors 22 and 28 are chosen correctly, the method can be used to commutate the motor even during the initial spin-up of the motor, during which time the frequency of the tachometer signal varies. The upper charge levels of capacitors 22 and 28 are not critical; if the period is longer, the capacitors 22 and 28 simply charge to a higher level. When the tachometer signal changes states due to a zero-crossing of the BEMF signal, the respective capacitor 22 or 28 will be discharged. When the lowest voltage level or some other predetermined voltage threshold level is reached, the sensing and triggering electronics sequences the motor to the next commutation state.

Although the technique is seemingly ideal, it is not without practical problems. For example, the tach signal of FIG. 3E is not exactly symmetrical due to e.g. errors in the spacing between magnetic poles of windings or random noise that cause erroneous determinations of BEMF zero-cross times. Because the timing of a given FCOM pulse is a function of the time period between two prior BEMF zero-cross times, any such variation in the measured spacing between preceding zero-crossing times may cause the motor to commutate to the next phase at the wrong time. Such erroneous commutation timing results in repetitive instants of sub-optimum torque, which in turn result in an undesirable phenomenon commonly known as "jitter."

For the foregoing reasons, there is a need for a commutation delay generator that provides a consistent commutation delay that is relatively insensitive to short-term variations in BEMF zero-cross timing.

SUMMARY

The present invention addresses the aforementioned need by providing an inventive commutation control circuit that is insensitive to short-term variations in BEMF zero-cross timing. The commutation control circuit includes a frequency-to-current converter that receives the periodic series of commutation signals as input and outputs a delay current of a magnitude that is inversely proportional to the average period of the series of commutation signals (i.e., the average FCOM period). This proportional current is used to charge a delay capacitance of known value to provide a selected voltage change across the delay capacitance.

Because the delay current used to charge the capacitance is proportional to the average commutation period, the charging time of the capacitance is also proportional to the average commutation period. For example, if the delay current were to double, the charge time of the delay capacitance would decrease by a factor of two. Similarly, if the delay current were to decrease by a factor of two, the charge time of the delay capacitance would double.

The commutation delay generator also includes a back-EMF sensor that senses the back EMF induced in an unpowered winding of the motor. The level of the back EMF provides an indication of the position of the rotor. When the back EMF across the unpowered winding equals zero, the delay circuit begins to charge the delay capacitance with the delay current. When the voltage change across the delay capacitance reaches a selected threshold (thereby indicating that the delay period has expired), the delay circuit issues an FCOM pulse to commutate the motor.

In one embodiment of the invention, the delay capacitance is alternately charged and discharged a number of times to provide an increased total voltage change without requiring an increased supply voltage. This embodiment allows for the use of a relatively small capacitor to provide the delay capacitance.

BRIEF DESCRIPTION OF THE FIGURES

These and other features, aspects, and advantages of the present invention will become understood with regard to the following description, appended claims, and accompanying drawings, where:

DETAILED DESCRIPTION

Figure 5:
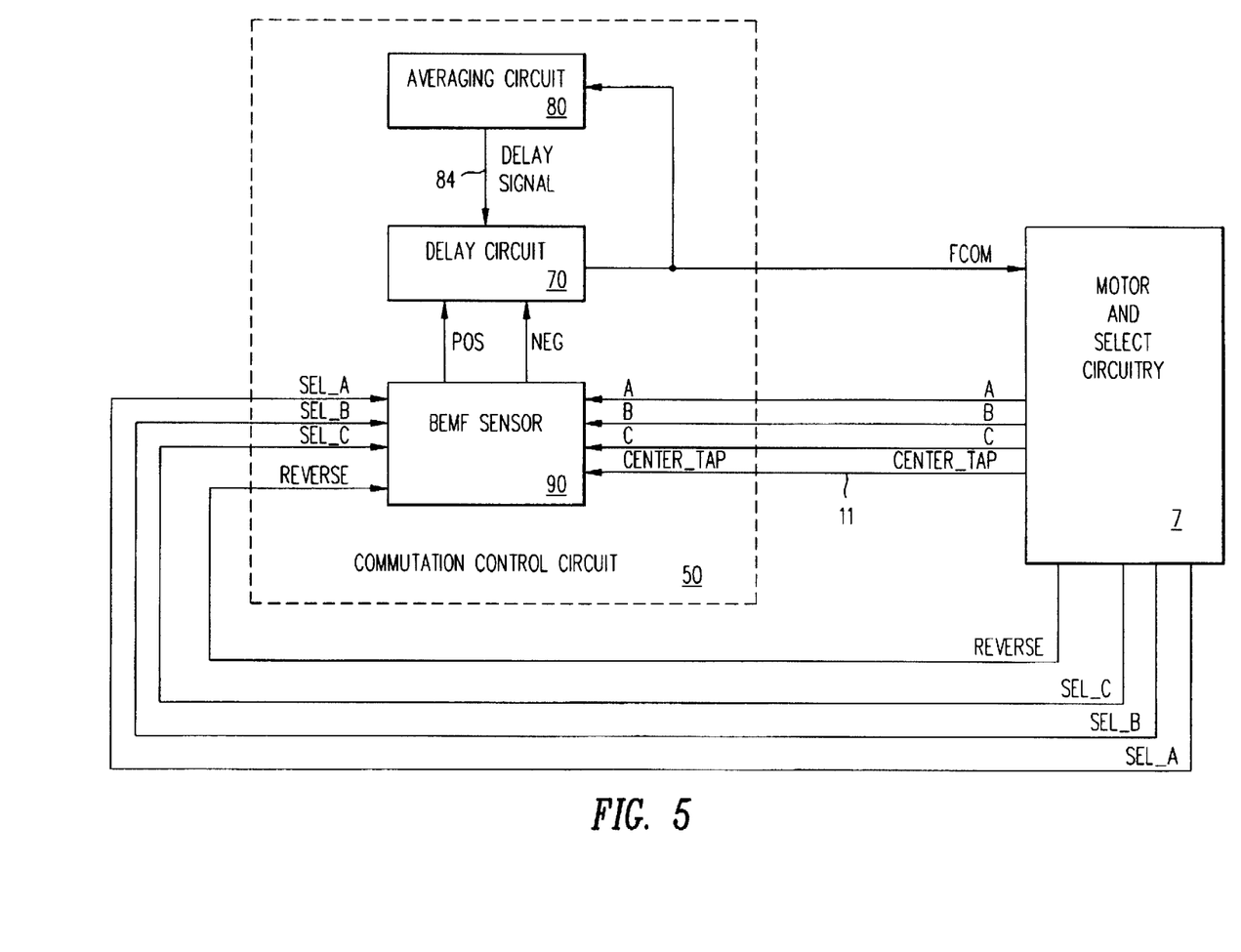
FIG. 5 is a block diagram of a commutation control circuit coupled to a conventional spin motor.

FIG. 5 is a block diagram of a commutation control circuit 50 in accordance with the present invention coupled to the conventional motor and select circuitry 7 of FIG. 1. Control circuit 50 includes a delay circuit 70 that provides a substantially periodic series of FCOM pulses to motor and select circuitry 7 and to an averaging circuit 80. The FCOM pulses cause motor and select circuitry 7 to commutate from one phase to the next in the manner explained above with respect to the conventional motor and select circuitry 7 of FIG. 1.

Averaging circuit 80 receives the FCOM pulses and outputs a delay signal on line 84 to delay circuit 70. In one embodiment, the delay signal is a current level of a magnitude proportional to the frequency (and therefore inversely proportional to the period) of the incoming series of FCOM pulses: the higher the commutation frequency, the higher the magnitude of the current level of the delay signal.

Conventional logic from motor and select circuitry 7 causes BEMF sensor 90 to select the center tap and the node of the unpowered winding (i.e., A, B, or C) so that the BEMF voltage developed across the unpowered winding is present across nodes POS and NEG. An input signal from sequencer 18 to terminal REVERSE ensures that center tap 11 and the node of the unpowered winding are selected such that the voltage on node POS is moving in a generally positive direction relative to the voltage on node NEG. Thus configured, delay circuit 70 detects a "zero cross" (i.e., when the BEMF voltage across the unpowered winding is zero) when the voltage on node POS is equal to the voltage on node NEG. Delay circuit 70 then uses the timing of the zero cross and the current level of the delay signal on line 84 to establish the appropriate timing for a subsequent FCOM pulse.

Figure 6:
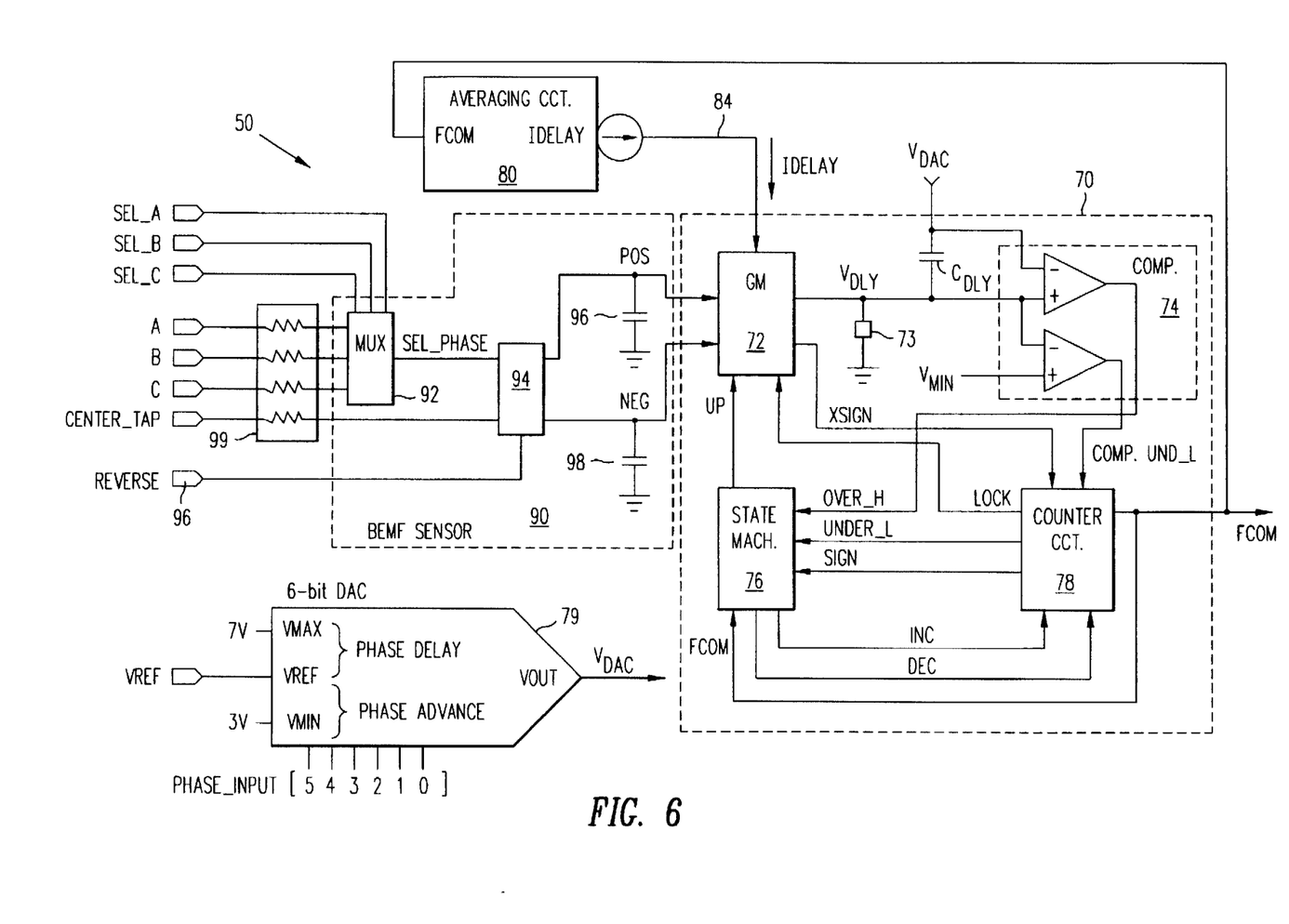
FIG. 6 is a schematic diagram of the commutation control circuit of FIG. 5.

FIG. 6 is a schematic diagram of commutation control circuit 50 of FIG. 5, including averaging circuit 80, BEMF sensor 90, and delay circuit 70. BEMF sensor 90 receives a number of input signals from motor and select circuitry 7. Nodes A, B, and C are electrically the same nodes as nodes A, B, and C, respectively, of FIG. 1. As explained above with respect to FIG. 5, the voltage levels on nodes A, B, and C, when measured with respect to the voltage level on center tap 11, provide an indication of zero-cross timing. A resistor network 99 includes four resistors that combine with capacitors 96 and 98 to create a pair of low-pass filters for the BEMF of the unpowered windings. The resistors of resistor network 99 are typically 200 KΩ each, while capacitors 96 and 98 are typically 20 pF each.

As explained above in connection with FIGS. 1 and 2B, when phase A is unpowered the BEMF voltage between node A and center tap 11 crosses the zero-voltage axis when the motor torque is at a maximum value. And, to provide the least amount of torque ripple, the motor must be commutated at 30 electrical degrees after this maximum. To this end, delay circuit 70 senses the BEMF voltage across nodes POS and NEG to determine the timing of a zero cross. Then, delay circuit 70, using the zero cross as a timing reference, waits for a delay period $T_{DLY}$ equal to approximately 30 electrical degrees (i.e., approximately $T_{FCOM}/2$) and outputs an FCOM pulse to motor and select circuitry 7, averaging circuit 80, and sequencer 18.

Averaging circuit 80 includes a frequency-to-current converter 82 that outputs a delay current $I_{delay}$ on line 84. After start-up, the magnitude of current $I_{delay}$ is inversely proportional to the average period of the FCOM signal from delay circuit 70. Stated mathematically, $$I_{delay} = \frac{\alpha}{T_{FCOM}} \quad (1)$$

where $T_{FCOM}$ is the average period of e.g. one hundred FCOM pulses and α is the gain factor of frequency-to-current converter 80. Typical values for α and $T_{FCOM}$ are 3.47 nC and 347 μs, respectively, resulting in a delay current $I_{delay}$ of approximately 10 μA.

Averaging circuit 80 may be any conventional frequency-to-current converter that is configured to provide an output current proportional to the average commutation period $T_{FCOM}$ of the commutation signal on terminal FCOM. Because of inherent spacing errors between motor stators, it is recommended that the number of FCOM periods averaged be equal to at least the number of FCOM pulses for a single mechanical rotation, which is e.g. 24 in a eight-pole motor. The upper limit of the number of FCOM periods averaged is quite high, (e.g., one thousand), for the average FCOM period $T_{FCOM}$ is very small compared to the acceleration time constant of a typical motor. If the number is too high, the commutation timing will be slow to respond to changes in motor speed.

The commutation delay period $T_{DLY}$ is calculated using the equation:

$$T_{DLY} = \frac{C_{DLY} \Delta V_{DLY}}{I_{delay}} \quad (2)$$

where $\Delta V_{DLY}$ represents the total change in voltage across capacitance $C_{DLY}$. Substituting for $I_{delay}$ in accordance with equation (1) above, the commutation delay period $T_{DLY}$ becomes:

$$T_{DLY} = \frac{(C_{DLY} \Delta V_{DLY})}{\alpha} T_{FCOM} \quad (3)$$

By selecting the values of $C_{DLY}$, $\Delta V_{DLY}$, and the constant α so that the factor $C_{DLY} \Delta V_{DLY}/\alpha = \frac{1}{2}$, the FCOM delay period $T_{DLY}$ is set to exactly one half of the average FCOM period $T_{FCOM}$, or $T_{FCOM}/2$. If the factor $C_{DLY} \Delta V_{DLY}/\alpha$ is greater than one half, the delay period $T_{DLY}$ will be greater than $T_{FCOM}/2$, causing a phase delay on the commutation. Conversely, if the factor $C_{DLY} \Delta V_{DLY}/\alpha$ is less than one half, the result will be a phase advance on the commutation.

Delay circuit 70 includes a current-controlled transconductance amplifier 72 and a delay capacitance $C_{DLY}$. Amplifier 72 receives the BEMF signal POS-NEG (i.e., the voltage difference between nodes POS and NEG) and the delay current $I_{DLY}$ on line 84. When the voltage on node POS exceeds the voltage on node NEG (i.e., when a zero-crossing occurs), amplifier 72 outputs a delay current on node $V_{DLY}$ that is equal in magnitude to that of the delay current $I_{delay}$ on line 84. The current on node $V_{DLY}$ charges (or discharges) delay capacitor $C_{DLY}$ until the factor $C_{DLY} \Delta V_{DLY}/\alpha = \frac{1}{2}$, at which time delay circuit 70 outputs an FCOM pulse.

As explained above, each FCOM pulse is developed after delay period $T_{DLY}$ that is established using the average FCOM period $T_{FCOM}$. This is problematic, as there are no FCOM periods to average when the motor is initially started up. To solve this problem, averaging circuit 80 is configured to provide some minimum level of delay current when the commutation signal on terminal FCOM has a frequency of between e.g. zero and 150 Hz. This minimum delay current develops FCOM pulses of a predetermined frequency when the motor is first started up until the commutation frequency reaches a level sufficient to develop a delay current $I_{delay}$ greater than the offset current. Once delay current $I_{delay}$ is greater than the offset current, averaging circuit 80 gains control of delay period $T_{dly}$ so that the delay period $T_{DLY}$ will behave in accordance with equation (1). In one embodiment, averaging circuit 80 is a frequency-to-current converter with an offset current of approximately 500 nA, and is of the type described in the above-referenced application entitled "Frequency-To-Current Converter".

In accordance with the embodiment of FIG. 6, the value (and therefore physical size) of delay capacitance $C_{DLY}$ is minimized to allow for easier, more economical integration of the capacitance. The method and circuitry used to minimize capacitance $C_{DLY}$ is described below in connection with FIGS. 6 through 11.

For a given capacitance C with a constant charging current $I_C$, the time constant $\tau_C$ of capacitance C is proportional to the product of the change in voltage $\Delta V$ and the capacitance C divided by the charging current $I_C$. This relationship may be expressed mathematically as:

$$\tau_c = \frac{C \Delta V}{I_c} \quad (4)$$

According to equation (4), for a given time constant $\tau_C$ the necessary value of the capacitance C (and thus the physical area required to integrate such a capacitance) may be minimized by either increasing $\Delta V$ or decreasing the current $I_C$.

Unfortunately, there is a lower limit to the level of current $I_C$ that may be used to charge the capacitance C, for when the current is too low, noise and leakage result in unacceptably poor accuracy in defining the time constant $\tau_C$. Moreover, increasing $\Delta V$ is not a simple matter because it is not practical to substantially increase the power supply voltages for integrated circuits to increase the time constant of a particular capacitor. For these reasons, Applicant invented a technique that allows for an effective increase in the change of voltage on delay capacitance $C_{DLY}$ without requiring increased voltage potentials. According to this aspect of the invention, the desired voltage range is "folded" into a number of smaller voltage ranges. For a detailed discussion of a similar folding technique used to increase the effective value of a capacitance, see the related application entitled "Frequency-to-Current Converter," which is incorporated herein by reference.

According to the inventive folding technique, a 16-volt $\Delta V$ on node $V_{DLY}$ is folded into e.g. four segments, two decreasing and two increasing. That is, instead of charging capacitance $C_{DLY}$ from e.g. one to 17 volts to obtain a $\Delta V$ of 16 volts, capacitance $C_{DLY}$ is charged and discharged between one and five volts four times (i.e., four 4-volt changes), for a total $\Delta V$ of 16 volts. In this way, the necessary value of delay capacitance $C_{DLY}$ is decreased by a factor of four. This decrease in capacitance translates into a similar decrease in physical size that advantageously allows delay capacitance $C_{DLY}$ to be more readily integrated.

In the embodiment of FIG. 6, the commutation delay period $T_{DLY}$ may be adjusted by changing the reference voltage on terminal $V_{DAC}$, and therefore the voltage range $\Delta V$ of node $V_{DLY}$, using a conventional 6-bit digital-to-analog converter 79. Of course, other adjustable or fixed voltage references may also be used. However, embodiments that include adjustable phase delay advantageously allow users to optimize the delay period $T_{DLY}$ for particular applications.

Figure 7:
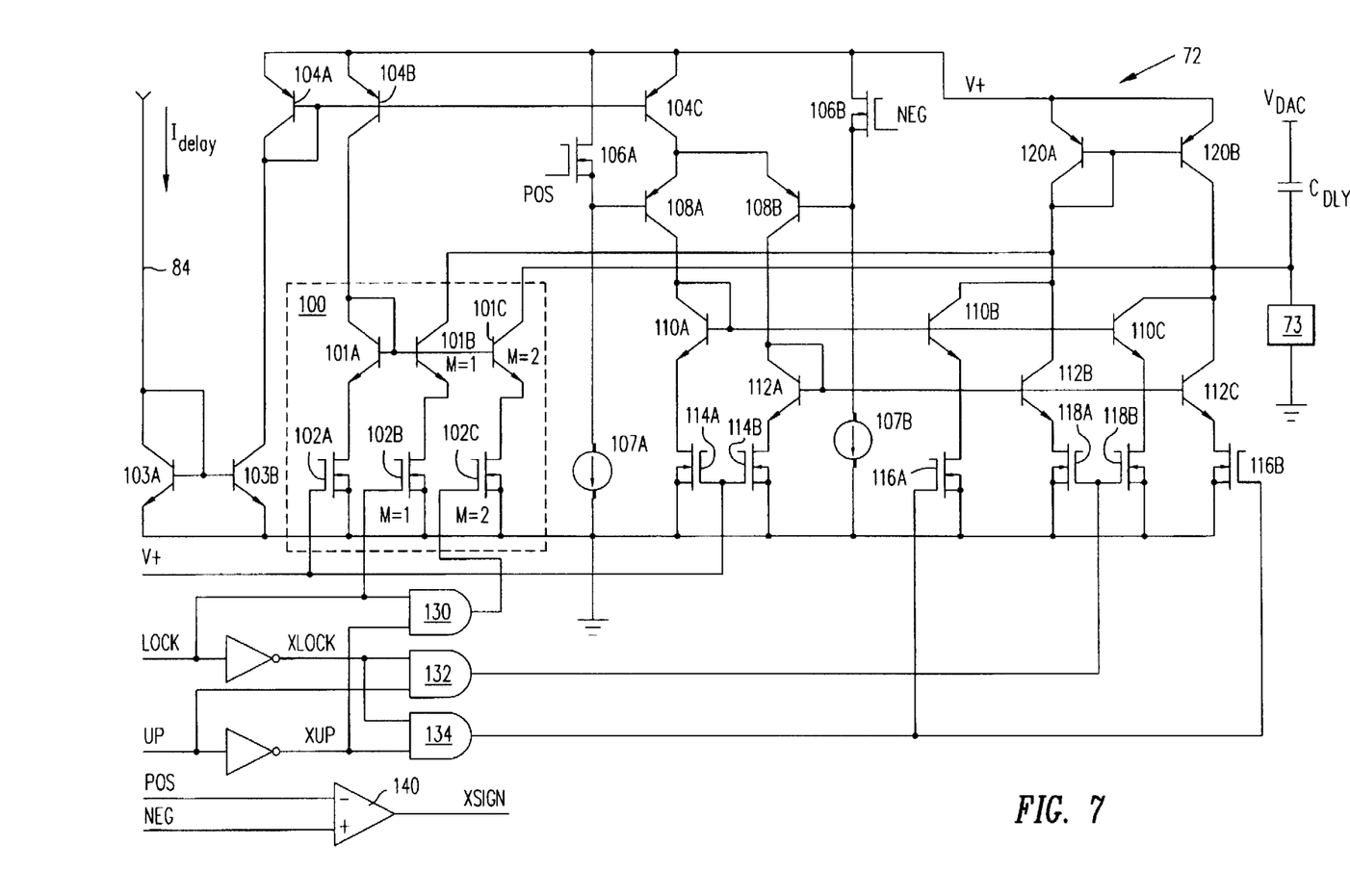
FIG. 7 is an amplifier 72 in accordance with an embodiment of the invention.

FIG. 7 is a schematic diagram of transconductance amplifier 72 coupled to delay capacitance $C_{DLY}$ and voltage clamp 73. The purpose of amplifier 72 is to charge and discharge delay capacitance $C_{DLY}$ at a rate established by the delay current $I_{delay}$. Recall that a zero cross is detected when the voltage on node POS "crosses" the voltage on node NEG, and that an FCOM pulse should be developed after a delay period $T_{DLY}$ equal to one-half of the average FCOM period $T_{FCOM}$, or $T_{FCOM}/2$. Recall also that the current $I_{delay}$ is inversely proportional to the average FCOM period $T_{FCOM}$, and is therefore also inversely proportional to a delay of $T_{FCOM}/2$. Because of this proportionality, the delay period $T_{DLY}$ can be established by charging and discharging capacitance $C_{DLY}$ a predetermined number of times using the delay current $I_{delay}$.

Transconductance amplifier 72 includes input transistors 106A and 106B, which receive inputs on lines POS and NEG from BEMF sensor 90. Transistors 106A and 106B are level-shift transistors that are biased by current sources 107A and 107B, respectively. Transconductance amplifier 72 also includes a POS-NEG lockout circuit 100 that causes amplifier 72 to ignore the signals on terminals POS and NEG when counter circuit 78 outputs a logic one on line LOCK. The purpose for the lock signal is described below in connection with FIGS. 8 and 9. For the present, assume that the lock signal on line LOCK is a logic zero, in which case transistors 102B and 102C are off and POS-NEG lockout circuit 100 is therefore deactivated.

When the signal on line UP is a logic one, indicating that delay capacitance $C_{DLY}$ is to be charged "up," delay current $I_{delay}$ is mirrored first by transistors 103A and 103B then by transistors 104A and 104B to provide a current substantially equal to the delay current $I_{delay}$ through either transistors 108A and 110A or transistors 108B and 112A, the current path depending on the relative signal levels on terminals POS and NEG. If the voltage on node POS is more positive than the voltage on node NEG, then the current equal to the delay current $I_{delay}$ will pass through transistors 108B and 112A, and will consequently be mirrored by transistor 112B (because the voltage on line XUP is a logic zero, the output of AND gate 134 will be a logic zero; thus, transistor 116B, and therefore transistor 112C, cannot conduct). The current through transistor 112B will be mirrored by transistors 120A and 120B so that delay capacitance $C_{DLY}$ will be charged by a current substantially equal to the delay current $I_{delay}$; consequently, the voltage on node $V_{DLY}$ will increase. If, on the other hand, the voltage on node POS is more negative than the voltage on node NEG, then a current equal to the delay current $I_{delay}$ will pass through transistors 108A and 110A, and will consequently be mirrored by transistor 110C (because the voltage on line XUP is a logic zero, transistor 116A, and therefore transistor 110B, cannot conduct). Transistor 110C will draw charge from $C_{DLY}$, thereby decreasing the voltage on node $V_{DLY}$.

Amplifier 72 exhibits the opposite behavior when the signal on line UP is a logic zero, indicating that delay capacitance $C_{DLY}$ is to be discharged by a current substantially equal to the delay current $I_{delay}$. In that case, a voltage on node POS that is more positive than that on node NEG will cause delay capacitance $C_{DLY}$ to discharge at a rate determined by a discharge current substantially equal to the delay current $I_{delay}$. Further, a voltage on node POS that is more negative than that on node NEG will cause delay capacitance $C_{DLY}$ to charge at a rate determined by a current substantially equal to delay current $I_{delay}$. This behavior allows for the "folding" of delay capacitance $C_{DLY}$ and the consequent reduction in the necessary value of capacitance $C_{DLY}$.

A logic one on line LOCK activates POS-NEG lockout circuit 100, causing amplifier 72 to ignore the voltages on nodes POS and NEG. The inverted lock signal on line LOCK, through AND gates 132 and 134, turns off transistors 116A, 116B, 118A, and 118B, while the lock signal turns on transistor 102B and, consequently, transistor 101B. In this condition, transistors 101B and 102B constantly draw a current substantially equal to the delay current $I_{delay}$ through transistor 120A. The current is mirrored by transistor 120B to charge delay capacitor $C_{DLY}$.

Transistors 101C and 102C have multiplication factors M of two (M=2), as compared to the multiplication factors of one (M=1) for transistors 101A, 101B, 102A, and 102B. Consequently, when transistor 102C is activated (i.e., when line XUP is at a logic one), transistors 101C and 102C draw a current of approximately twice the delay current $I_{delay}$ from delay capacitor $C_{DLY}$. Because delay capacitor is charged via transistors 101B and 102B with a current approximately equal to $I_{delay}$, the net result is that delay capacitance $C_{DLY}$ is discharged with a discharge current substantially equal to $I_{delay}$. Thus, when the signal on line LOCK is a logic one, the logic level on line UP alone determines whether delay capacitance $C_{DLY}$ is charged or discharged: the inputs to terminals POS and NEG are ignored.

Also shown in FIG. 7, nodes POS and NEG are connected to the inverting and non-inverting inputs, respectively, of a comparator 140, which has an output node XSIGN. The voltage on node XSIGN is a logic one when the voltage on node POS is less than the voltage on node NEG, and is a logic zero when the voltage on node POS is greater than the voltage on node NEG. The signal on node XSIGN is used to control whether counter circuit 78 of FIG. 6 increments or decrements.

Figure 8:
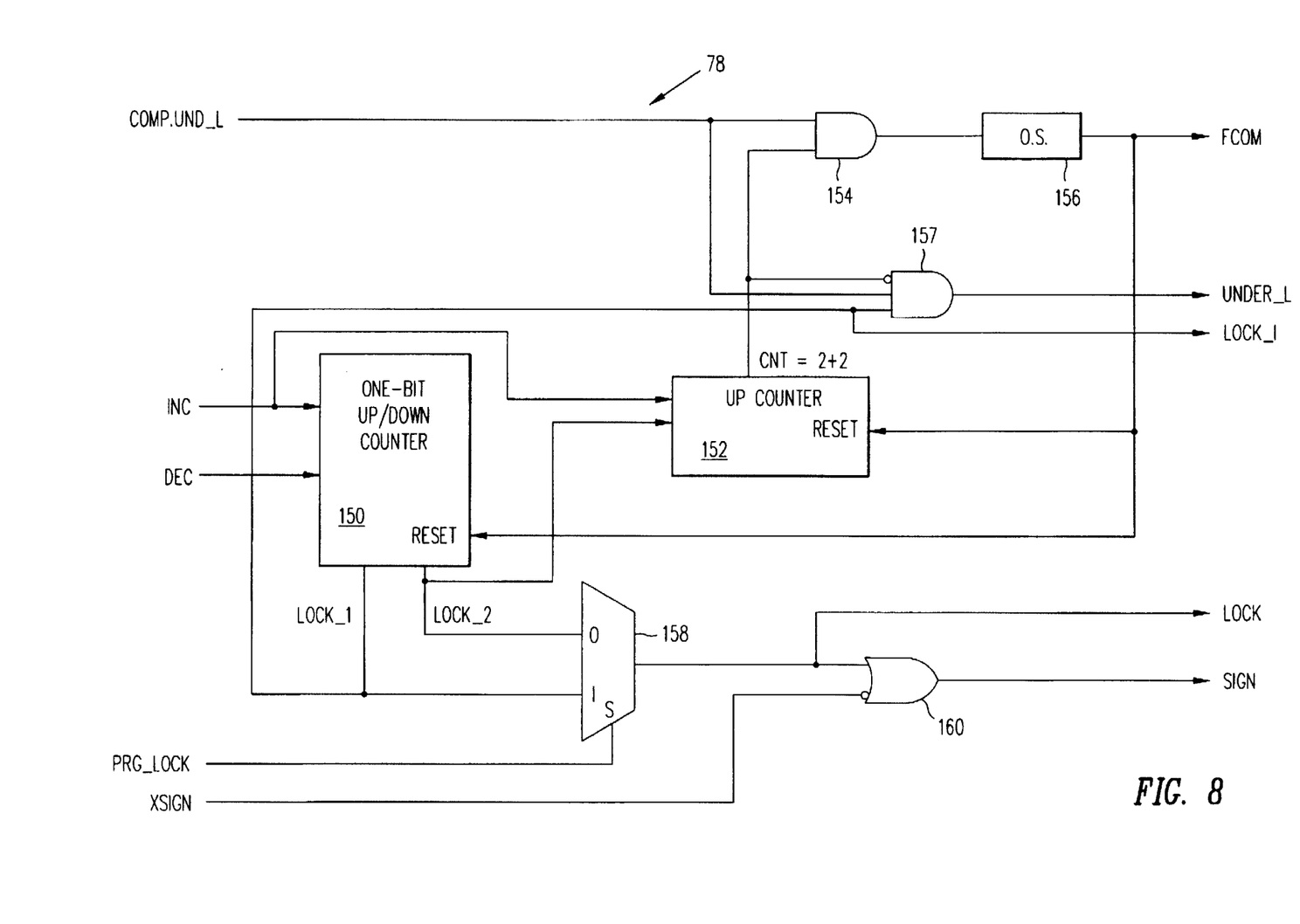
FIG. 8 is a schematic diagram of a counter circuit 78 in accordance with an embodiment of the present invention.

FIG. 8 is a schematic diagram of counter circuit 78 of FIG. 6. Counter circuit 78 receives signals from state machine 76 (on increment line INC and decrement line DEC) that allow counter circuit 78 to count the number of times delay capacitor $C_{DLY}$ charges and discharges. A delay period $T_{DLY}$ is established by multiplying the charge and discharge times of capacitance $C_{DLY}$ by the number of counts stored in counter circuit 78. This delay period $T_{DLY}$ is used to determine the timing of the FCOM pulse following each detected zero-cross.

Counter circuit 78 includes a one-bit up/down counter 150 and an up counter 152. Up/down counter 150 and up counter 152 combined count the number of times delay capacitance $C_{DLY}$ charges; up/down counter 150 stores the least-significant digit of the count and up counter 152 stores the remaining two significant digits. Counter circuit 78 also includes AND gates 154 and 157, each of which has an input connected to node COMP.UND_L from comparator circuit 74 and an input connected to up counter 152 via a line "CNT=2+2." AND gate 157 includes an additional input connected to line LOCK_1. The output of AND gate 154 is connected to the input of a twenty-five-microsecond one shot 156.

Up/down counter 150 has two output terminals, LOCK_1 and LOCK_2, both of which are coupled to the inputs of a two-input multiplexer 158. The select input S of multiplexer 158 is coupled to a programmable logic level via a line PRG_LOCK, and the output of multiplexer 158 is coupled to an input of an OR gate 160. OR gate 160 also receives an input from amplifier 72 of FIG. 7 via line XSIGN and provides an output to state machine 76 via a line SIGN.

Positive-going input pulses on lines INC and DEC cause up/down counter 150 to increment and decrement, respectively. When the count stored by counter 150 is less than one, counter 150 outputs a logic zero on line LOCK_1, and when the count is less than two, counter 150 outputs a logic zero on line LOCK_2. A logic zero on line LOCK_2 disables up counter 152. This logic zero is also provided through multiplexer 158 to one input of OR gate 160. Consequently, when the count is less than two the logic level on node SIGN will be the inverted signal on node XSIGN from amplifier 72. That is, if the voltage on node POS is more positive than that on node NEG, the voltage on node SIGN will be a logic one, and if the voltage on node NEG is more positive than that on node POS, the voltage on node SIGN will be a logic zero.

Up/down counter 150 is used to integrate the signal on node $V_{DLY}$ for a selected period following a zero-cross detection. For this reason, up/down counter 150 is designed to count backward, as may be necessary when the count is greater than zero and a noise spike causes the signal POS-NEG to go below zero. Once the count is greater than two the signal on line LOCK_2 disables the output of differential amplifier 140 by providing a constant logic one to an input of OR gate 160 so that subsequent negative noise spikes of signal POS-NEG are ignored.

Up/down counter 150 establishes a window during which capacitance $C_{DLY}$ integrates the signal on node $V_{DLY}$. Upon reaching a count of either one or two, depending on which of lines LOCK_1 and LOCK_2 are selected by the logic level on line PRG_LOCK, multiplexer 158 outputs a logic one to an input of OR gate 160. The logic level on program-lock line PRG_LOCK is programmable, allowing users of the inventive delay circuit to select the desired time period after which amplifier 72 will ignore noise spikes on nodes POS and NEG. Assuming, for example, a logic zero on program-lock line PRG_LOCK, noise spikes that cause the voltage POS-NEG to go below zero will not effect the value of the voltage on node SIGN once up/down counter 150 reaches a count of two. Consequently, such noise spikes will not effect the charge and discharge rates of capacitance $C_{dly}$.

Figure 9:
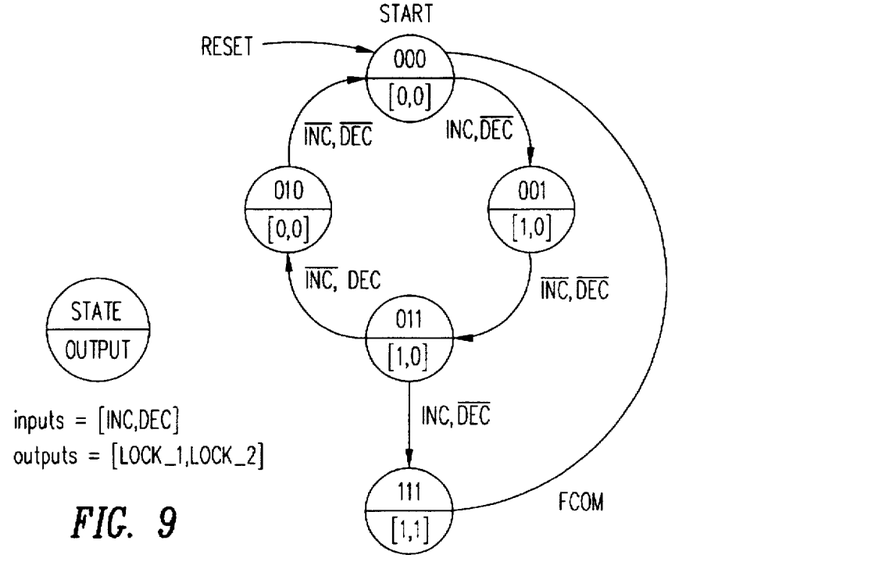
FIG. 9 is a state diagram of the one-bit up/down counter 150 of FIG. 8.

FIG. 9 shows a state diagram that provides a functional description of one-bit up/down counter 150. Counter 150 receives as inputs an increment signal on line INC and a decrement signal on line DEC. When commutation control circuit 50 is reset or develops a commutation pulse, counter 150 is reset to state 000. Upon the positive edge of an increment pulse on line INC, counter 150 increments to state 001 and outputs a logic one on line LOCK_1. Then, on the trailing edge of the same increment pulse, counter 150 transitions to state 011. From state 011, counter 150 can either be decremented so that the signal on line LOCK_1 returns to zero, or incremented so that line LOCK_2 transitions to a logic one.

Once the signal on line LOCK_2 is a logic one (i.e., once the count stored in up/down counter 150 is two), the logic one on line LOCK_2 enables up counter 152 so that counter circuit 78 can continue counting beyond two. Then, once up counter 152 reaches a predetermined number of charge/discharge cycles (two in the present example) and the voltage on node $V_{DLY}$ drops below the reference voltage on node $V_{MIN}$ causing the signal on node COMP.UND_L to go high, AND gate 154 provides an output pulse that, after being extended to 25 microseconds by one shot 156, is output as an FCOM pulse on node FCOM.

Figure 10:
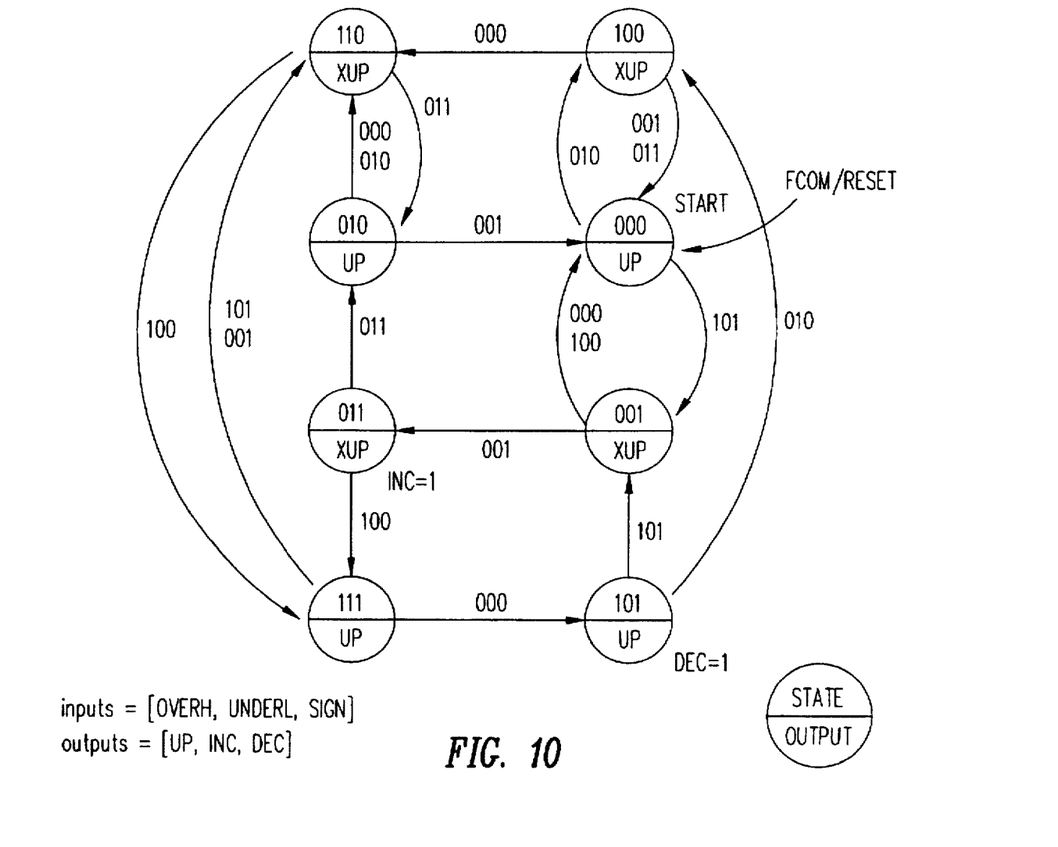
FIG. 10 is a state diagram of state machine 76 of FIG. 6.

FIG. 10 shows a state diagram that provides a functional description of state machine 76. The inputs to state machine 76 are the signals on nodes OVER_H, UNDER_L, SIGN, and FCOM. A logic one on node OVER_H indicates that the voltage on node $V_{DLY}$ is greater than the voltage on node $V_{dac}$. A logic one on node UNDER_L, the output of AND gate 157 of FIG. 8, indicates that:

1. the voltage on node $V_{DLY}$ is below the voltage on node $V_{MIN}$, as evidenced by a logic one on line COMP.UND_L;

2. the count stored in up/down counter 150 is greater than one, as evidenced by a logic one on line LOCK_1; and 3. the count stored in up counter 152 is less than two, as evidenced by a logic zero on line CNT=2+2.

Finally, as described above in connection with FIG. 7, a logic one on node SIGN indicates that the voltage on node POS is more positive than the voltage on node NEG.

Figure 11:
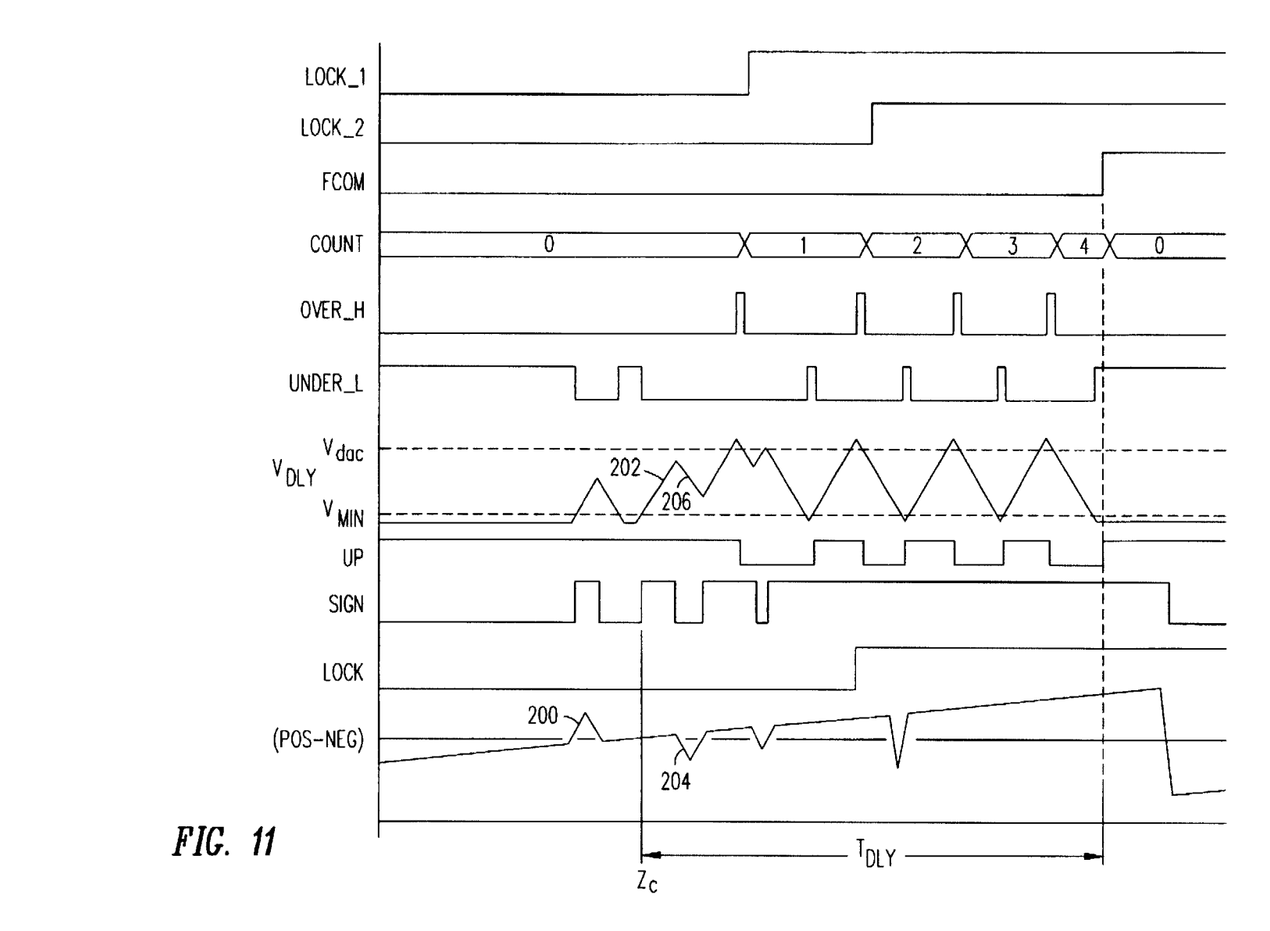
FIG. 11 is a waveform diagram describing the function of delay circuit 70 of FIG. 6.

Referring to the waveforms of FIG. 11, the time $Z_C$ represents the instant that the BEMF signal POS-NEG crosses the zero-voltage axis. The BEMF signal POS-NEG crosses zero at other times due to noise; however, for purposes of the following description, the time $Z_C$ represents the true zero cross. Delay circuit 70 operates to provide an FCOM pulse a delay period $T_{DLY}$ (i.e., a delay of one half the average FCOM period $T_{FCOM}$) after the zero cross at time $Z_C$.

State machine 76 receives as inputs the digital (binary) signals on lines OVER_H, UNDER_L, SIGN, and FCOM, and outputs a digital signal on line UP to amplifier 72 and digital signals on increment line INC and decrement line DEC to counter 78. After each FCOM pulse (and when commutation control circuit 50 is reset or powered up), state machine 76 is reset to state 000 and counter circuit 78 is configured to store a count of zero. In state 000, state machine 76 outputs a logic one on line UP to amplifier 72. As explained above in connection with FIG. 7, when the voltage on line UP is positive, amplifier 72 charges delay capacitance $C_{DLY}$ when the voltage on node POS is more positive than the voltage on node NEG, and discharges delay capacitance $C_{DLY}$ when the voltage on node POS is more negative than the voltage on node NEG.

Before the zero crossing at time $Z_C$, BEMF signal POS-NEG will be negative in the absence of positive noise spikes. As such, the voltage on node $V_{DLY}$ will remain low. When a noise spike, such as spike 200, causes BEMF signal POS-NEG to go above zero, the logic level on node SIGN will change from low to high and the voltage on node $V_{DLY}$ will begin to increase. As shown in FIG. 11, when spike 200 decreases to zero volts, the logic level on node SIGN returns to a logic low, causing the voltage on node $V_{DLY}$ to decrease.

At time $Z_C$ BEMF signal POS-NEG again crosses zero. Consequently, the signal on node SIGN becomes a logic one and the voltage on node $V_{DLY}$ begins to climb once again. When the voltage on node $V_{DLY}$ increases above the voltage on node $V_{MIN}$, comparator 74 will output a logic zero on node UNDER_L. Thus, during the positive-going segment 202 of the voltage on node $V_{DLY}$, the inputs on nodes OVER_H, UNDER_L, and SIGN will be 0, 0, and 1, respectively.

While the voltage on line UP remains a logic one, any negative noise spikes that go below zero will reverse the direction of voltage change on node $V_{DLY}$. For example, during a negative noise spike 204, the voltage on node $V_{DLY}$ decreases along a negative-going segment 206. Once noise spike 204 returns to a voltage greater than zero, the voltage on node $V_{DLY}$ will again increase. Eventually, the voltage on node $V_{DLY}$ will rise above the reference voltage on node $V_{DAC}$ causing comparator 74 to output a logic one on node OVER_H. At this point, the inputs on nodes OVER_H, UNDER_L, and SIGN will be 1, 0, and 1, respectively. These inputs will cause state machine 76 to transition from state 000 to state 001 so that state machine 76 outputs a logic zero on line UP. As described above in connection with FIG. 6, providing a logic zero on the line UP to amplifier 72 reverses the behavior of amplifier 72 with respect to BEMF signal POS-NEG. That is, when the voltage on node POS is more positive than that on node NEG, amplifier 72 discharges delay capacitor $C_{DLY}$, causing the voltage on node $V_{DLY}$ to decrease. And, when the voltage on node POS is more negative than that on node NEG, amplifier 72 charges delay capacitor $C_{DLY}$, causing the voltage on node $V_{DLY}$ to begin to increase.

Shortly after capacitance $C_{DLY}$ begins to discharge, the voltage on node $V_{DLY}$ will fall below the voltage on node $V_{DAC}$ so that the signal on node OVER_H will return to a logic zero. Assuming that BEMF signal POS-NEG remains positive, state machine 76 will receive the inputs 0, 0, and 1 on input nodes OVER_H, UNDER_L, and SIGN, respectively, and will consequently move from state 001 to state 011. State machine 76 will then output a logic one on node INC causing the count stored in counter circuit 78 to increment. In the present case, the count increases from zero to one, as indicated by the signal COUNT of FIG. 11.

For brevity, only a few of the eight possible states of state machine 76 are described above. The remaining states, as shown in state diagram of FIG. 10, will be readily understood by those skilled in the art.

Capacitance $C_{DLY}$ will charge and discharge in the manner described above until the count stored by counter circuit 78 reaches a predetermined number. In the example of FIG. 11, for example, counter circuit 78 is configured to issue an FCOM pulse when the count is four (i.e., the count of up/down counter 150 is two and the count of up counter 152 is two) and the signal on node UNDER_L is one. The FCOM pulse on node FCOM is conveyed to sequencer 18 to initiate a commutation and also to reset both state machine 76 and counter circuit 78. The above-described process is then repeated for each subsequent zero cross so that an FCOM pulse is consistently developed after a delay of approximately 30 electrical degrees from each zero cross.

Commutation delay generators in accordance with the present invention are not limited to the particular applications described above. For example, the electric motors that can benefit from such delay generators are not limited to disk drive motors. In addition, timing references from which to begin a delay period may be derived from sources other than BEMF sensors, such as Hall effect sensors. Therefore, the scope of the appended claims should not be limited to the description of the preferred versions described herein.

What is claimed is:

1. A commutation control circuit for an electric motor, the commutation control circuit comprising:

a motor position sensor having an output node for providing a timing reference signal;

a delay circuit having an input node and an output node, wherein the input node of the delay circuit is connected to the output node of the position sensor to receive the timing reference signal from the position sensor, and wherein the delay circuit, upon receiving the timing reference signal from the position sensor, provides a commutation signal on the output node of the delay circuit after a delay period proportional to the average period of a selected number of commutation pulses; and     an averaging circuit having an output node coupled to a second input node of the delay circuit, the output node providing the delay circuit with a delay signal having a magnitude proportional to the average period of a series of the selected number of commutation pulses.

2. The commutation control circuit of claim 1, wherein the position sensor comprises a back-EMF sensor including first and second input nodes coupled to the first and second nodes of one of the windings, the back-EMF sensor further including first and second output nodes for providing a back-EMF signal that is proportional to back EMF induced in the one of the windings.

3. The commutation control circuit of claim 2, wherein the first-mentioned input node of the delay circuit is coupled to the first output node of the back-EMF sensor and a second input node of the delay circuit is coupled to the second output node of the back-EMF sensor.

4. The commutation control circuit of claim 3, wherein the delay circuit detects one of the timing references when the back-EMF signal reaches a selected threshold level.

5. The commutation control circuit of claim 2, wherein the averaging circuit includes a frequency-to-current converter, and wherein the delay signal is a delay current.

6. The commutation control circuit of claim 5, wherein the frequency-to-current converter further comprises a capacitor having a capacitance selected to determine the number of the commutation signals over which to provide an average period.

7. The commutation control circuit of claim 6, wherein the number of the commutation signals is at least equal to the number of commutation signals required for one full mechanical revolution of the motor.

8. The commutation control circuit of claim 7, the delay circuit further comprising:
- a delay capacitance having first node coupled to a voltage reference and second node;
- an amplifier including a current input node coupled to the output node of the averaging circuit and an output node coupled to the second node of the delay capacitance, wherein the amplifier changes the voltage stored on the second node of the delay capacitance at a rate proportional to the magnitude of the delay current; and
- a comparator circuit having a first input node coupled to the second node of the delay capacitance, the comparator providing the one of the commutation signals on the output node of the delay circuit when the voltage level on the second node of the delay capacitance equals a second selected threshold level.

9. The commutation control circuit of claim 8, wherein the amplifier alternately charges and discharges the delay capacitance between two voltage levels before the comparator circuit provides the one of the commutation signals.

10. The commutation control circuit of claim 9, wherein the voltage reference is adjustable.

11. A commutation control circuit for providing a substantially periodic series of commutation signals to a commutation input terminal of a commutation sequencer, the sequencer for sequentially providing current through selected ones of a plurality of motor windings, each of the windings including first and second nodes, the control circuit comprising:
- a frequency-to-current converter having an input node coupled to the commutation input terminal and an output node providing a commutation delay current having a magnitude proportional to the average period of the series of commutation signals;
- a back-EMF sensor including first and second inputs coupled to the first and second nodes of one of the windings, the sensor further including first and second output nodes for providing a back-EMF signal that is proportional to back EMF induced in the one of the windings; and
- a delay circuit including:
  - a delay capacitance having first node coupled to a voltage reference and second node;
  - an amplifier including a first input node coupled to the averaging circuit output node to receive the delay current proportional to the average period of the series of commutation signals, a second input node coupled to the first output node of the back-EMF sensor and a third input node coupled to the second output node of the back-EMF sensor, and an output node coupled to the second node of the delay capacitance, wherein the amplifier changes the voltage stored on the second node of the delay capacitance at a rate proportional to the magnitude of the delay current when the back-EMF signal exceeds a first selected threshold level; and
  - a comparator circuit having a first input node coupled to the second node of the delay capacitance, the comparator providing the one of the commutation signals when the voltage level on the second node of the delay capacitance equals a second selected threshold level.

12. A method of commutating an electric motor, the method comprising:
- receiving a substantially periodic series of commutation signals;
- developing a delay period proportional to the average period of the series of commutation signals;
- monitoring the motor for an indication of motor position, wherein the indication of motor position provides periodic timing references;
- commencing the delay period upon receipt of one of the timing references; and
- providing a new commutation signal at the end of the delay period.

13. The method of claim 12, wherein the series of preceding signals comprises a plurality of commutation signals preceding the new commutation signal.

14. The method of claim 12, further comprising the step of charging a capacitance with a delay current having a magnitude proportional to the average period of the series such that the capacitance charges at a rate proportional to the average period of the series.

15. A commutation control circuit for providing a substantially periodic series of commutation signals a commutation input terminal of a commutation sequencer, the sequencer for sequentially providing current through selected ones of a plurality of motor windings, each of the windings including first and second nodes, the control circuit comprising:
- means for averaging a series of signals to provide a delay signal proportional to the average period of the series of signals; and
- a delay circuit having a first input node for receiving a timing reference, a second input node for receiving the delay signal, and an output node, the delay circuit for developing a delay period using the delay signal such that the delay period is, like the delay signal, proportional to the average period of the series of signals.

16. The commutation control circuit of claim 15, wherein the delay circuit, upon receiving the timing reference, provides a commutation signal after the delay period.

17. The commutation control circuit of claim 16, wherein the series of signals comprises preceding commutation pulses.

* * * * *